(12) United States Patent
Maruyama (10) Patent No.: US 11,296,625 B2
(45) Date of Patent: Apr. 5, 2022

(54) CONTROL DEVICE AND CONTROL METHOD FOR SYNCHRONOUS ELECTRIC MOTOR

(71) Applicant: Sinfonia Technology Co., Ltd., Tokyo (JP)

(72) Inventor: Makoto Maruyama, Tokyo (JP)

(73) Assignee: Sinfona Technology Co., Ltd., Tokyo (JP)

(*) Notice: Subject to any disclaimer, the term of this patent is extended or adjusted under 35 U.S.C. 154(b) by 29 days.

(21) Appl. No.: 16/639,089

(22) PCT Filed: May 14, 2018

(86) PCT No.: PCT/JP2018/018446
§ 371 (c)(1),
(2) Date: Feb. 13, 2020

(87) PCT Pub. No.: WO2019/053943
PCT Pub. Date: Mar. 21, 2019

(65) Prior Publication Data
US 2020/0212829 A1 Jul. 2, 2020

(30) Foreign Application Priority Data
Sep. 14, 2017 (JP) .............................. JP2017-176701

(51) Int. Cl.
*H02P 6/28* (2016.01)
*H02P 6/17* (2016.01)
*H02M 7/44* (2006.01)

(52) U.S. Cl.
CPC .............. *H02P 6/28* (2016.02); *H02M 7/44* (2013.01); *H02P 6/17* (2016.02)

(58) Field of Classification Search
CPC ...... H02P 6/28; H02P 6/17; H02P 6/08; H02P 27/08; H02M 7/44; H02M 7/48
See application file for complete search history.

(56) References Cited

U.S. PATENT DOCUMENTS 5,194,794 A * 3/1993 Shamoto ................ B62D 5/046
180/446
7,443,127 B2 * 10/2008 Okazaki .................. B60L 50/51
318/722
(Continued)

FOREIGN PATENT DOCUMENTS

EP 2131489 A1 12/2009
EP 2273666 A1 1/2011
(Continued)

OTHER PUBLICATIONS

Japan Patent Application No. PCT/JP2018/018446, International Search Report (and English translation), dated Aug. 7, 2018.
(Continued)

*Primary Examiner* — Rina I Duda
(74) *Attorney, Agent, or Firm* — Kilpatrick Townsend & Stockton LLP (57) ABSTRACT

A control device 1 for a synchronous electric motor that switches a drive control of the synchronous electric motor to a PWM drive control and a rectangular wave drive control includes a PWM signal generator 14 configured to generate a PWM signal, a rectangular wave signal generator 22 configured to generate a rectangular wave signal, a rotation speed detector 40 configured to detect a rotation speed of the motor 2, a signal switching determination part 50 configured to determine, according to at least the rotation speed, whether the PWM signal or the rectangular wave signal is used as a control signal when controlling the drive of the motor 2, and a drive controller 30 configured to control the drive of the motor 2 using a signal determined by the signal switching determination part 50 to be used as the control signal.

6 Claims, 5 Drawing Sheets

(56) References Cited

U.S. PATENT DOCUMENTS

| | | | | |
|---|---|---|---|---|
| 7,834,515 B2* | 11/2010 | Tanimura | ............... | H02N 2/145 |
| | | | | 310/317 |
| 8,423,217 B2* | 4/2013 | Kojima | ................ | B60W 10/08 |
| | | | | 701/22 |
| 9,020,731 B2* | 4/2015 | Yamada | ................ | B60L 15/007 |
| | | | | 701/84 |
| 2006/0250102 A1* | 11/2006 | Payne | ................ | G05B 19/4062 |
| | | | | 318/569 |
| 2008/0218111 A1* | 9/2008 | Okamura | ................. | H02P 6/15 |
| | | | | 318/453 |
| 2014/0306629 A1 | 10/2014 | Nakamura et al. | | |
| 2015/0311833 A1* | 10/2015 | Bai | ....................... | H02P 27/085 |
| | | | | 318/51 |
| 2016/0094163 A1* | 3/2016 | Takahashi | ............... | B60L 50/61 |
| | | | | 318/400.06 |

FOREIGN PATENT DOCUMENTS

| | | | |
|---|---|---|---|
| JP | 2005-218299 A | 8/2005 | |
| JP | 2007-259575 A | 10/2007 | |
| JP | 2013-230052 A | 11/2013 | |
| JP | 2014-207765 A | 10/2014 | |
| JP | 2017-060367 A | 3/2017 | |

OTHER PUBLICATIONS

Europe Patent Application No. 18857106.1, Extended European Search Report, dated Apr. 14, 2021.

\* cited by examiner

FIG. 7

CONTROL DEVICE AND CONTROL METHOD FOR SYNCHRONOUS ELECTRIC MOTOR

CROSS-REFERENCE TO RELATED APPLICATIONS

This application is a national phase entry under 35 USC § 371 of International Application PCT/JP2018/018446 ("the '446 application"), filed May 14, 2018, which application claims priority to and benefits of Japan Patent Application No. 2017-176701 ("the '701 application"), filed on Sep. 14, 2017. The '446 application and the '701 applications are hereby incorporated in their entireties by this reference.

TECHNICAL FIELD

The present disclosure relates to a control device for controlling the drive of a synchronous electric motor and a control method for a synchronous electric motor.

BACKGROUND

As a control method for controlling the drive of a synchronous electric motor, there are known a PWM drive control using a PWM signal and a rectangular wave drive control using a pulsed rectangular wave signal. In the PWM drive control, a voltage within a range of a sine wave voltage waveform outputted from a control device for a synchronous electric motor can be applied to the synchronous electric motor. On the other hand, in the rectangular wave drive control, a voltage is applied to a synchronous electric motor in a pulsed manner so that the maximum voltage inputted to a control device for a synchronous electric motor can be applied to the synchronous electric motor. Therefore, in general, the modulation rate in the rectangular wave drive control is higher than the modulation rate in the PWM drive control.

In order to improve the voltage utilization rate of a synchronous electric motor, a method of switching between the PWM drive control and the rectangular wave drive control is used as a control method for the synchronous electric motor. As a configuration for switching between the PWM drive control and the rectangular wave drive control in this way, for example, configurations disclosed in Patent Documents 1 to 3 are known.

Patent Document 1 discloses a drive control device for an AC motor that switches between a PWM current control and a rectangular wave voltage phase control in accordance with the current phase of the alternating current supplied to the AC motor. In the drive control device disclosed in Patent Document 1, it is necessary to detect the current phase of the alternating current. Therefore, a current sensor and a current phase determination part are necessary.

Patent Document 2 discloses an inverter control device that switches between a PWM control and a one-pulse control based on a torque command value of a motor. In the inverter control device disclosed in Patent Document 2, the value obtained from the current detected by the current sensor is fed back to the torque command value so that the motor is driven according to the torque command value.

Patent Document 3 discloses a drive control device for an electric motor that switches between PWM energization and rectangular wave energization using a voltage command (Duty). The drive control device disclosed in Patent Document 3 performs control switching between the PWM energization and the rectangular wave energization without using a current sensor.

PRIOR ART DOCUMENTS

Patent Documents

Patent Document 1: Japanese laid-open publication No. 2005-218299

Patent Document 2: Japanese laid-open publication No. 2017-60367

Patent Document 3: Japanese laid-open publication No. 2014-207765

In recent years, there has been a demand for a control device that switches the drive control of a synchronous electric motor without providing a current detector for detecting an alternating current supplied to the synchronous electric motor. Therefore, as the drive control of the synchronous electric motor, it has been studied to use the drive control disclosed in Patent Document 3 instead of the drive control disclosed in Patent Document 1 or 2 that requires current detection.

However, in the drive control of Patent Document 3, the PWM drive control and the rectangular wave drive control are switched using only the voltage command (Duty). For this reason, in the configuration of Patent Document 3, an appropriate drive control cannot be selected from the PWM drive control and the rectangular wave drive control in accordance with the rotation speed of the synchronous electric motor.

For example, when the rotation speed of the synchronous electric motor is high, the current that can be caused to flow through the synchronous electric motor decreases due to an increase in the induced voltage generated in the synchronous electric motor. Therefore, it is preferable that the rectangular wave drive control having a higher voltage utilization rate is used for the drive control of the synchronous electric motor. However, in the configuration of Patent Document 3 in which the drive control of the synchronous electric motor is switched regardless of the rotation speed of the synchronous electric motor, there is a possibility that the rectangular wave drive control cannot be used when the rotation speed of the synchronous electric motor is high.

In addition, when the rotation speed of the synchronous electric motor is low, the potential difference between the voltage applied to the synchronous electric motor and the induced voltage generated in the synchronous electric motor is large, and the period of a half cycle of an electrical angle is long. Therefore, when rectangular wave drive control is used for the drive control of the synchronous electric motor, there is a possibility that an overcurrent may flow through a switching element of a specific phase in the control device and a coil of a specific phase in the synchronous electric motor. In the configuration of Patent Document 3, the rotation speed of the synchronous electric motor is not taken into account as described above. Therefore, there is a possibility that the drive control of the synchronous electric motor can be switched to the rectangular wave drive control even when the rotation speed of the synchronous electric motor is low.

The present invention provides some embodiments of a control device for a synchronous electric motor that switches a drive control of the synchronous electric motor between a PWM drive control and a rectangular wave drive control, wherein the control device includes a configuration capable of efficiently driving the synchronous electric motor in consideration of the influence of a rotation speed of the synchronous electric motor.

SUMMARY

According to one embodiment of the present disclosure, there is provided a control device for a synchronous electric motor that controls a drive of the synchronous electric motor. The control device includes a PWM signal generator configured to generate a PWM signal based on an input command, a rectangular wave signal generator configured to generate a rectangular wave signal based on the input command, a rotation speed detector configured to detect a rotation speed of the synchronous electric motor, a signal switching determination part configured to determine, according to at least the rotation speed, whether the PWM signal generated by the PWM signal generator or the rectangular wave signal generated by the rectangular wave signal generator is used as a control signal when controlling the drive of the synchronous electric motor, and a drive controller configured to control the drive of the synchronous electric motor using either the PWM signal or the rectangular wave signal that is determined by the signal switching determination part to be used as the control signal.

According to another embodiment of the present disclosure, there is provided a control method for a synchronous electric motor that controls a drive of the synchronous electric motor using a PWM signal or a rectangular wave signal generated based on an input signal. The control method includes: a rotation speed acquisition step of acquiring a rotation speed of the synchronous electric motor; a voltage command amplitude acquisition step of acquiring an amplitude of a voltage command corresponding to the PWM signal based on an input command; a signal switching determination step of determining, according to at least the rotation speed, whether the PWM signal or the rectangular wave signal is used as a control signal when controlling the drive of the synchronous electric motor; and a drive control step of controlling the drive of the synchronous electric motor using either the PWM signal or the rectangular wave signal that is determined in the signal switching determination step to be used as the control signal.

According to the control device for the synchronous electric motor of one embodiment of the present disclosure, the drive of the synchronous electric motor is controlled using either the PWM signal or the rectangular wave signal depending on the amplitude of the voltage command generated in response to the PWM signal based on the input command and the rotation speed of the synchronous electric motor. Thus, the control device has a configuration capable of efficiently driving the synchronous electric motor in consideration of the influence of the rotation speed of the synchronous electric motor.

DETAILED DESCRIPTION

A control device for a synchronous electric motor according to an embodiment of the present disclosure is a control device for the synchronous electric motor that controls a drive of the synchronous electric motor. The control device includes a PWM signal generator configured to generate a PWM signal based on an input command, a rectangular wave signal generator configured to generate a rectangular wave signal based on the input command, a rotation speed detector configured to detect a rotation speed of the synchronous electric motor, a signal switching determination part configured to determine, according to at least the rotation speed, whether the PWM signal generated by the PWM signal generator or the rectangular wave signal generated by the rectangular wave signal generator is used as a control signal when controlling the drive of the synchronous electric motor, and a drive controller configured to control the drive of the synchronous electric motor using either the PWM signal or the rectangular wave signal that is determined by the signal switching determination part to be used as the control signal (first configuration).

Thus, the drive control using either the PWM signal or the rectangular wave signal can be performed according to at least the rotation speed of the synchronous electric motor. Therefore, the PWM drive control using the PWM signal and the rectangular wave drive control using the rectangular wave signal can be performed at an appropriate timing with respect to the rotation speed of the synchronous electric motor. Accordingly, it is possible to efficiently drive the synchronous electric motor.

In the first configuration, the control device for a synchronous electric motor further includes a voltage command generator configured to generate a voltage command corresponding to the PWM signal based on the input command. The signal switching determination part is configured to: determine that the PWM signal is used as the control signal if the rotation speed is lower than a rotation speed threshold value or if a voltage command amplitude is smaller than a voltage command amplitude threshold value; and determine that either the PWM signal or the rectangular wave signal is used as the control signal according to at least one of a drive control state of the synchronous electric motor by the drive controller and the voltage command amplitude if the rotation speed is equal to or higher than the rotation speed threshold value (second configuration).

Thus, when the rotation speed of the synchronous electric motor is lower than the rotation speed threshold value, the synchronous electric motor is driven and controlled by PWM drive control. When the rotation speed of the synchronous electric motor is lower than the rotation speed threshold value, if the synchronous electric motor is controlled by the rectangular wave drive control, there is a possibility that an overcurrent may flow through the switching element of the control device and the coil of the synchronous electric motor. Therefore, as described above, when the rotation speed of the synchronous electric motor is lower than the rotation speed threshold value, the synchronous electric motor is driven and controlled by the PWM drive control. This makes it possible to prevent the overcurrent from flowing through the control device and the synchronous electric motor.

Furthermore, even when the amplitude of the voltage command generated in response to the PWM signal is smaller than the voltage command amplitude threshold value, the synchronous electric motor is driven and controlled by the PWM drive control. When the voltage command amplitude is smaller than the voltage command amplitude threshold value, it is not necessary to improve the voltage utilization rate of the synchronous electric motor. Therefore, the synchronous electric motor is driven and controlled by the PWM drive control.

On the other hand, when the rotation speed of the synchronous electric motor is equal to or higher than the rotation speed threshold value, the PWM drive control or the rectangular wave drive control is performed according to at least one of the drive control state of the synchronous electric motor by the drive controller and the voltage command amplitude, whereby the PWM drive control and the rectangular wave drive control can be switched at an appropriate timing. This makes it possible to efficiently drive the synchronous electric motor.

In the second configuration, the signal switching determination part is configured to: set a first rotation speed threshold value, which is a threshold value of a rotation speed used at the time of switching the PWM signal to the rectangular wave signal, as the rotation speed threshold value if a drive control of the synchronous electric motor by the drive controller is a PWM drive control drive-controlled by the PWM signal, and determine that the rectangular wave signal is used as the control signal if the rotation speed is equal to or higher than the first rotation speed threshold value and if the voltage command amplitude is equal to or larger than a voltage command amplitude threshold value; and set a second rotation speed threshold value, which is a threshold value of a rotation speed used at the time of switching the rectangular wave signal to the PWM signal, as the rotation speed threshold value if the drive control of the synchronous electric motor by the drive controller is a rectangular wave drive control drive-controlled by the rectangular wave signal, and determine that the PWM signal is used as the control signal if the rotation speed is lower than the second rotation speed threshold value (third configuration).

As a result, when the synchronous electric motor is driven and controlled by the PWM drive control, if the rotation speed of the synchronous electric motor is equal to or higher than the first rotation speed threshold value and the voltage command amplitude is equal to or larger than the voltage command threshold value, i.e., if the current flowing through the synchronous electric motor is decreased due to an increase in the induced voltage generated in the synchronous electric motor despite the large voltage command amplitude, the voltage supplied to the synchronous electric motor can be increased by driving the synchronous electric motor with the rectangular wave drive control. Therefore, it is possible to prevent a decrease in the torque generated in the synchronous electric motor.

On the other hand, when the synchronous electric motor is driven and controlled by the rectangular wave drive control, if the rotation speed of the synchronous electric motor is lower than the rotation speed threshold value, it is possible to prevent an overcurrent from flowing through the control device and the synchronous electric motor by controlling the synchronous electric motor with the PWM drive control.

Moreover, with the above-described configuration, when switching the drive control of the synchronous electric motor from the rectangular wave drive control to the PWM drive control, it is unnecessary to determine the voltage command amplitude as when switching the drive control of the synchronous electric motor from the PWM drive control to the rectangular wave drive control. Therefore, when the drive control of the synchronous electric motor is switched from the rectangular wave drive control to the PWM drive control, it is possible to reduce the calculation load of the control device.

In the third configuration, the first rotation speed threshold value is larger than the second rotation speed threshold value (fourth configuration).

If the PWM drive control and the rectangular wave drive control are frequently switched due to a minute change in the rotation speed, the drive control of the synchronous electric motor is not stable. On the other hand, with the above-described configuration, at the rotation speed described above, a region available when switching the PWM drive control to the rectangular wave drive control and a region available when switching the rectangular wave drive control to the PWM drive control overlap with each other. Therefore, it is possible to prevent frequent changes in the drive control of the synchronous electric motor due to minute fluctuations in the rotation speed of the synchronous electric motor. Accordingly, the drive control of the synchronous electric motor can be performed stably.

In the second configuration, the signal switching determination part is configured to: set a first rotation speed threshold value, which is a threshold value of a rotation speed used at the time of switching the PWM signal to the rectangular wave signal, as the rotation speed threshold value while setting a first voltage command amplitude threshold value, which is a threshold value of a voltage command amplitude used at the time of switching the PWM signal to the rectangular wave signal, as the voltage command amplitude threshold value if a drive control of the synchronous electric motor by the drive controller is a PWM drive control drive-controlled by the PWM signal, and determine that the rectangular wave signal is used as the control signal if the rotation speed is equal to or higher than the first rotation speed threshold value and if the voltage command amplitude is equal to or larger than the first voltage command amplitude threshold value; and set a second rotation speed threshold value, which is a threshold value of a rotation speed used at the time of switching the rectangular wave signal to the PWM signal, as the rotation speed threshold value while setting a second voltage command amplitude threshold value, which is a threshold value of a voltage command amplitude used at the time of switching the rectangular wave signal to the PWM signal, as the voltage command amplitude threshold value if the drive control of the synchronous electric motor by the drive controller is a rectangular wave drive control drive-controlled by the rectangular wave signal, and determine that the PWM signal is used as the control signal if the rotation speed is lower than the second rotation speed threshold value or if the voltage command amplitude is smaller than the second voltage command amplitude threshold value (fifth configuration).

Thus, the rotation speed threshold value and the voltage command amplitude threshold value are changed according to the drive control of the synchronous electric motor determined by the drive control determination part. Therefore, appropriate threshold values can be set according to the state of the drive control of the synchronous electric motor. Accordingly, the switching between the PWM drive control and the rectangular wave drive control in the drive control of the synchronous electric motor can be performed more appropriately according to the operation state of the synchronous electric motor.

In the fifth configuration, the first rotation speed threshold value is larger than the second rotation speed threshold value. The first voltage command amplitude threshold value is larger than the second voltage command amplitude threshold value (sixth configuration).

If the PWM drive control and the rectangular wave drive control are frequently switched due to a minute change in the rotation speed and the voltage command amplitude, the drive control of the synchronous electric motor is not stable. On the other hand, with the above-described configuration, at the rotation speed and the voltage command amplitude described above, a region available when switching the PWM drive control to the rectangular wave drive control and a region available when switching the rectangular wave drive control to the PWM drive control overlap with each other. Therefore, it is possible to prevent frequent changes in the drive control of the synchronous electric motor due to minute fluctuations in the rotation speed and the voltage command amplitude of the synchronous electric motor. Accordingly, the drive control of the synchronous electric motor can be performed stably.

A control method for a synchronous electric motor according to an embodiment of the present disclosure is a control method for a synchronous electric motor that controls a drive of the synchronous electric motor using a PWM signal or a rectangular wave signal generated based on an input signal. The control method includes: a rotation speed acquisition step of acquiring a rotation speed of the synchronous electric motor; a voltage command amplitude acquisition step of acquiring an amplitude of a voltage command corresponding to the PWM signal based on an input command; a signal switching determination step of determining, according to at least the rotation speed, whether the PWM signal or the rectangular wave signal is used as a control signal when controlling the drive of the synchronous electric motor; and a drive control step of controlling the drive of the synchronous electric motor using either the PWM signal or the rectangular wave signal that is determined in the signal switching determination step to be used as the control signal (first method).

Thus, the switching between the PWM drive control and the rectangular wave drive control in the drive control of the synchronous electric motor can be appropriately performed according to the rotation speed of the synchronous electric motor. Accordingly, it is possible to efficiently drive the synchronous electric motor.

Hereinafter, embodiments of the present disclosure will be described in detail with reference to the drawings. The same or corresponding parts in the drawings are denoted by like reference numerals and the description thereof will not be repeated.

First Embodiment (Overall Structure)

Figure 1:
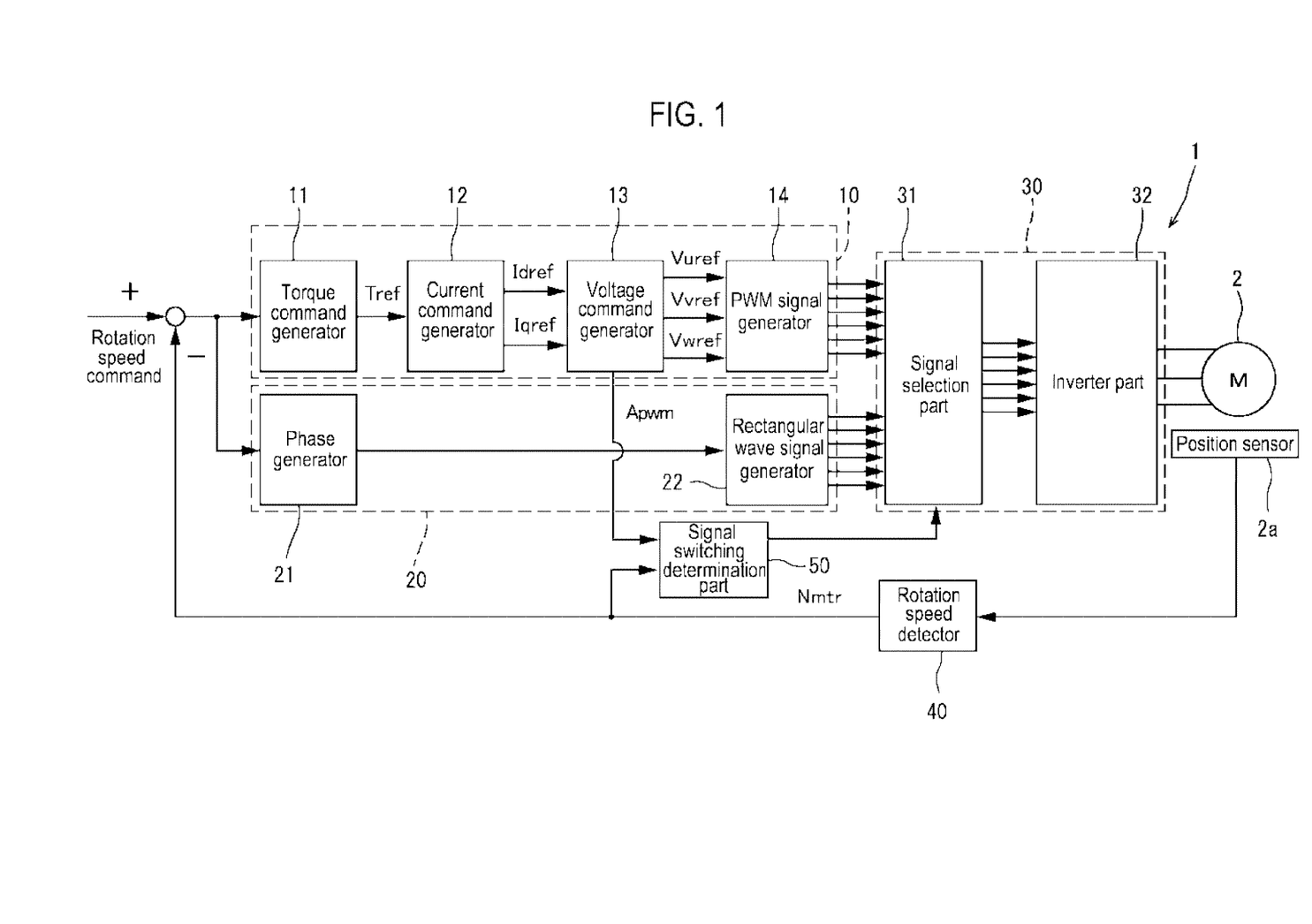
FIG. 1 is a control block diagram showing a schematic configuration of a control device according to a first embodiment.

FIG. 1 is a block diagram showing a schematic configuration of a control device 1 according to a first embodiment of the present disclosure. The control device 1 generates a PWM signal and a rectangular wave signal based on a rotation speed command as an input command, determines whether the PWM signal or the rectangular wave signal is used according to a voltage command amplitude and a rotation speed of a motor 2, and controls the drive of the motor (synchronous electric motor) 2 using the signal thus determined. In the present embodiment, the motor 2 is a three-phase AC motor. However, the motor 2 may be a motor having any configuration.

The control device 1 includes a PWM drive controller 10, a rectangular wave drive controller 20, a drive controller 30, a rotation speed detector 40, and a signal switching determination part 50.

The PWM drive controller 10 generates a PWM signal based on a rotation speed command (input command) inputted to the control device 1. The PWM drive controller 10 includes a torque command generator 11, a current command generator 12, a voltage command generator 13, and a PWM signal generator 14.

The torque command generator 11 generates a torque command Tref based on the rotation speed command inputted to the control device 1.

The current command generator 12 generates a d-axis current command Idref and a q-axis current command Iqref based on the torque command Tref generated by the torque command generator 11.

The voltage command generator 13 generates a d-axis voltage command Vdref and the q-axis voltage command Vqref based on the d-axis current command Idref and the q-axis current command Iqref generated by the current command generator 12, and generates a U-phase voltage command Vuref, a V-phase voltage command Vvref, and a W-phase voltage command Vwref from these commands. Moreover, the voltage command generator 13 obtains a voltage command amplitude Apwm, which is an amplitude of a voltage command in a PWM drive control, from the d-axis voltage command Vdref and the q-axis voltage command Vqref. The voltage command amplitude Apwm obtained by the voltage command generator 13 is inputted to a signal switching determination part 50 described below.

The voltage command generator 13 may regard one, which has the largest absolute voltage value, of the U-phase voltage command Vuref, the V-phase voltage command Vvref, and the W-phase voltage command Vwref as a voltage command amplitude and may handle the same as the voltage command amplitude Apwm.

The PWM signal generator 14 generates a PWM signal for a PWM drive control based on the U-phase voltage command Vuref, the V-phase voltage command Vvref, and the W-phase voltage command Vwref generated by the voltage command generator 13. This PWM signal is inputted to the drive controller 30 and is used for the drive control of a switching element (not shown) of the drive controller 30.

The configuration of each of the torque command generator 11, the current command generator 12, the voltage command generator 13, and the PWM signal generator 14 in the PWM drive controller 10 is the same as the configuration for generating each signal in the conventional PWM drive control. Therefore, the detailed description thereof is omitted.

The rectangular wave drive controller 20 generates a rectangular wave signal based on the rotation speed command (input command) inputted to the control device 1. The rectangular wave drive controller 20 includes a phase generator 21 and a rectangular wave signal generator 22.

The phase generator 21 generates a phase command based on the rotation speed command inputted to the control device 1. The rectangular wave signal generator 22 generates a rectangular wave signal based on the phase command generated by the phase generator 21. This rectangular wave signal is inputted to the drive controller 30 and is used for the drive control of the switching element (not shown) of the drive controller 30.

In addition, the configuration of each of the phase generator 21 and the rectangular wave signal generator 22 in the rectangular wave drive controller 20 is the same as the configuration for generating each signal in the conventional rectangular wave drive control. Therefore, the detailed description thereof is omitted.

The drive controller 30 controls the drive of the motor 2 using either the PWM signal generated by the PWM drive controller 10 or the rectangular wave signal generated by the rectangular wave drive controller 20. Specifically, the drive controller 30 includes a signal selection part 31 and an inverter part 32.

The signal selection part 31 selects either the PWM signal generated by the PWM drive controller 10 or the rectangular wave signal generated by the rectangular wave drive controller 20, according to a determination result of a signal switching determination part 50 described below. As will be described in detail below, the signal selection part 31 selects either the PWM signal or the rectangular wave signal according to the voltage command amplitude Apwm outputted from the voltage command generator 13 and the rotation speed Nmtr of the motor 2 detected by the rotation speed detector 40, and outputs the selected signal as a control signal.

The inverter part 32 supplies electric power to the coils (not shown) of the respective phases of the motor 2 based on the control signal (the PWM signal or the rectangular wave signal) outputted from the signal selection part 31. Although not particularly shown, the inverter part 32 includes a plurality of switching elements. The inverter part 32 controls the drive of these switching elements based on the control signal (the PWM signal or the rectangular wave signal) outputted from the signal selection part 31, whereby the electric power according to the PWM signal or the rectangular wave signal is supplied to the coil of each phase of the motor 2. Since the inverter part 32 includes the same configuration as that of the conventional inverter device, the description about the detailed configuration of the inverter part 32 is omitted.

That is, the drive controller 30 is configured to switch a drive control between a PWM drive control that controls the drive of the motor 2 using the PWM signal and a rectangular wave drive control that controls the drive of the motor 2 using the rectangular wave signal.

In the present embodiment, the motor 2 is controlled by the drive controller 30 so as to be rapidly accelerated from a stopped state to a region of a high rotation speed equal to or higher than a predetermined rotation speed. The drive controller 30 decelerates the motor 2 in a free-run state and stops the motor 2 by turning off all switching elements of the inverter part 32 after a lapse of a specified time after the motor 2 reaches the predetermined rotation speed or higher.

The rotation speed detector 40 detects a rotation speed Nmtr of the motor 2 based on a position signal outputted from a position sensor 2a that detects a rotation position of a rotor (not shown) of the motor 2.

The signal switching determination part 50 determines that according to the drive control state of the motor 2, the drive controller 30 controls the drive of the motor 2 using either the PWM signal or the rectangular wave signal as a control signal, based on the rotation speed Nmtr detected by the rotation speed detector 40 and the voltage command amplitude Apwm outputted from the voltage command generator 13. That is, the signal switching determination part 50 determines whether the PWM drive control or the rectangular wave drive control is performed by the drive controller 30. The drive control state of the motor 2 means a state in which the motor 2 is controlled by the PWM drive control or the rectangular wave drive control.

The signal switching determination part 50 outputs a determination signal that causes the signal selection part 31 of the drive controller 30 to select the rectangular wave signal when the rotation speed Nmtr and the voltage command amplitude Apwm are equal to or larger than predetermined threshold values, respectively. Otherwise, the signal switching determination part 50 outputs a determination signal that causes the signal selection part 31 of the drive controller 30 to select the PWM signal.

Specifically, when the drive controller 30 is performing the PWM drive control, if the rotation speed Nmtr is lower than a first rotation speed threshold value Nthr_one (rotation speed threshold value) and if the rotation speed Nmtr is equal to or higher than the first rotation speed threshold value Nthr_one and the voltage command amplitude Apwm is smaller than a first voltage command amplitude threshold value Athr_one (voltage command amplitude threshold value), the signal switching determination part 50 outputs a determination signal to cause the drive controller 30 to continue the PWM drive control. Furthermore, when the drive controller 30 is performing the PWM drive control, if the rotation speed Nmtr is equal to or higher than the first rotation speed threshold value Nthr_one and the voltage command amplitude Apwm is equal to or larger than the first voltage command amplitude threshold value Athr_one, the signal switching determination part 50 outputs a determination signal to cause the drive controller 30 to switch the PWM drive control to the rectangular wave drive control.

In addition, when the drive controller 30 is performing the rectangular wave drive control, if the rotation speed Nmtr is equal to or higher than a second rotation speed threshold value Nthr_pwm (rotation speed threshold value), the signal switching determination part 50 outputs a determination signal to cause the drive controller 30 to continue the rectangular wave drive control. When the drive controller 30 is performing the rectangular wave drive control, if the rotation speed Nmtr is lower than the second rotation speed threshold value Nthr_pwm, the signal switching determination part 50 outputs a determination signal to cause the drive controller 30 to switch the PWM drive control to the rectangular wave drive control.

In this regard, the second rotation speed threshold value Nthr_pwm is a rotation speed at which the rectangular wave drive control is switched to the PWM drive control so that no overcurrent flows through the motor 2 and the drive controller 30. Furthermore, the first rotation speed threshold value Nthr_one is larger than the second rotation speed threshold value Nthr_pwm.

The first voltage command amplitude threshold value Athr_one is a voltage command amplitude value at which the PWM drive control is switched to the rectangular wave drive control in consideration of the voltage utilization rate.

The signal switching determination part 50 stores the determination result in a memory or the like (not shown), and uses the determination result to determine whether the current drive control of the motor 2 is the PWM drive control or the rectangular wave drive control.

(Switching of Drive Control of Motor)

Figure 2:
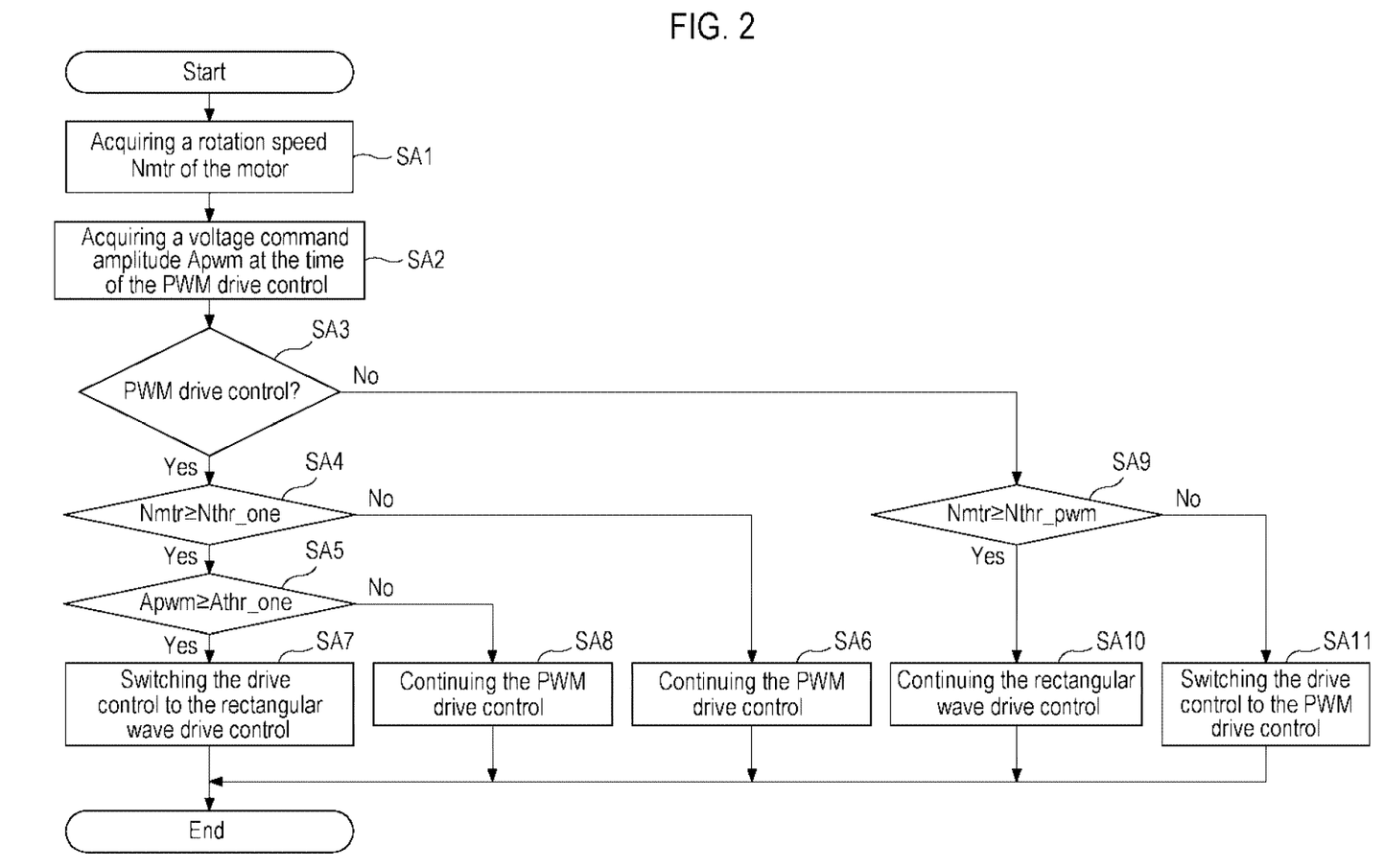
FIG. 2 is a flowchart showing an operation of a signal switching determination part.

Next, the switching operation of the drive control of the motor 2 in the control device 1 including the above-described configuration will be described with reference to FIG. 2. FIG. 2 is a flowchart showing switching determination of drive control of the motor 2 by the signal switching determination part 50.

If the flow shown in FIG. 2 is started (START), first, in step SA1, the signal switching determination part 50 acquires the rotation speed Nmtr of the motor 2 detected by the rotation speed detector 40. In subsequent step SA2, the signal switching determination part 50 acquires the voltage command amplitude Apwm outputted from the voltage command generator 13.

Thereafter, in step SA3, the signal switching determination part 50 determines whether the drive control executed by the drive controller 30 is the PWM drive control. If it is determined in step SA3 that the drive control executed by the drive controller 30 is the PWM drive control (if YES), the flow proceeds to step SA4 and subsequent steps to determine the rotation speed Nmtr of the motor 2.

On the other hand, if it is determined in step SA3 that the drive control executed by the drive controller 30 is not the PWM drive control, i.e., if it is determined that the drive control executed by the drive controller 30 is the rectangular wave drive control (if NO), the flow proceeds to step SA9 and subsequent steps to determine the rotation speed Nmtr of the motor 2.

In step SA4 to which the flow proceeds if the drive control executed by the drive controller 30 is the PWM drive control, it is determined whether the rotation speed Nmtr of the motor 2 is equal to or higher than the first rotation speed threshold value Nthr_one. The first rotation speed threshold value Nthr_one is a rotation speed of the motor 2 at which the PWM drive control can be switched to the rectangular wave drive control in the drive controller 30.

In step SA4, if the rotation speed Nmtr is equal to or higher than the first rotation speed threshold value Nthr_one (if YES), the flow proceeds to step SA5 and subsequent steps to determine the voltage command amplitude Apwm.

On the other hand, in step SA4, if the rotation speed Nmtr is lower than the first rotation speed threshold value Nthr_one (if NO), the flow proceeds to step SA6 and the signal switching determination part 50 outputs a determination signal that causes the drive controller 30 to continue the PWM drive control.

In step SA5 to which the flow proceeds if the rotation speed Nmtr is equal to or higher than the first rotation speed threshold value Nthr_one, it is determined whether the voltage command amplitude Apwm is equal to or larger than the first voltage command amplitude threshold value Athr_one. The first voltage command amplitude threshold value Athr_one is a voltage command amplitude value at which the PWM drive control is switched to the rectangular wave drive control in consideration of the voltage utilization rate.

If it is determined in step SA5 that the voltage command amplitude Apwm is equal to or larger than the first voltage command amplitude threshold value Athr_one (if YES), the flow proceeds to step SA7, and the signal switching determination part 50 outputs a determination signal to cause the drive controller 30 to switch to the rectangular wave drive control.

On the other hand, if it is determined in step SA5 that the voltage command amplitude Apwm is smaller than the first voltage command amplitude threshold value Athr_one (if NO), the flow proceeds to step SA8, and the signal switching determination part 50 outputs a determination signal to cause the drive controller 30 to continue the PWM drive control.

In steps SA6 to SA8, after the signal switching determination part 50 outputs the determination signal to the drive controller 30, the flow is ended (END).

In step SA9 to which the flow proceeds if the drive control executed by the drive controller 30 is determined to be the rectangular wave drive control (if NO) in the above-described step SA3, it is determined whether the rotation speed Nmtr of the motor 2 is equal to or higher than the second rotation speed threshold value Nthr_pwm. The second rotation speed threshold value Nthr_pwm is a rotation speed at which the rectangular wave drive control is switched to the PWM drive control so that no overcurrent flows through the motor 2 and the drive controller 30.

If the rotation speed Nmtr is equal to or higher than the second rotation speed threshold value Nthr_pwm (if YES) in step SA9, the flow proceeds to step SA10, and the signal switching determination part 50 outputs a determination signal to cause the drive controller 30 to continue the rectangular wave drive control.

On the other hand, if the rotation speed Nmtr is lower than the second rotation speed threshold value Nthr_pwm (if NO) in step SA9, the flow proceeds to step SA11, and the signal switching determination part 50 outputs a determination signal to cause the drive controller 30 to switch to the PWM drive control.

As described above, in the present embodiment, if the signal switching determination part 50 determines that the drive control executed by the drive controller 30 is the rectangular wave drive control (if NO in step SA3), only the rotation speed Nmtr is used to switch the drive control between the PWM drive control and the rectangular wave drive control. This is because the operation pattern of the motor 2 of the present embodiment is an operation pattern in which when stopping the motor 2, the motor 2 is decelerated in a free-run state and stopped. Therefore, when the drive control of the motor 2 is switched from the rectangular wave drive control to the PWM drive control, it is not necessary to consider the voltage command amplitude as the case of switching the drive control from the PWM drive control to the rectangular wave drive control. It is only necessary that the drive controller 30 is set so that the motor 2 can be controlled by the PWM drive control when the motor 2 is restarted after stopping the motor 2.

In steps SA10 and SA11, after the signal switching determination part 50 outputs the determination signal to the drive controller 30, the flow is ended (END).

In this regard, step SA1 corresponds to the rotation speed acquisition step, and step SA2 corresponds to the voltage command amplitude acquisition step. Steps SA3 to SA5 and SA9 correspond to the signal switching determination step, and steps SA6 to SA8, SA10, and SA11 correspond to the drive control step.

In the present embodiment, the first rotation speed threshold value Nthr_one is a rotation speed higher than the second rotation speed threshold value Nthr_pwm.

Figure 3:
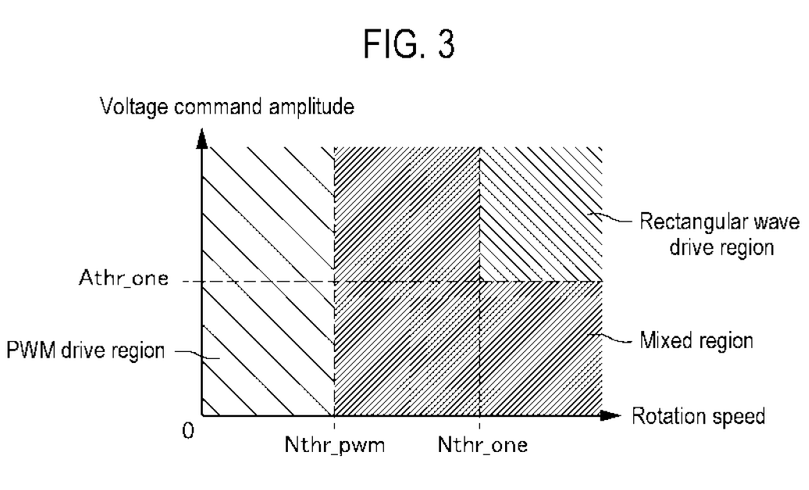
FIG. 3 is a view showing motor drive control regions defined by a first rotation speed threshold value, a second rotation speed threshold value, and a first voltage command amplitude threshold value.

FIG. 3 shows the drive control regions of the motor 2 defined by the first rotation speed threshold value Nthr_one, the second rotation speed threshold value Nthr_pwm, and the first voltage command amplitude threshold value Athr_one in the relationship between the rotation speed of the motor 2 and the voltage command amplitude.

As shown in FIG. 3, in the relationship between the rotation speed and the voltage command amplitude, there is a mixed region between a PWM drive region where the PWM drive control is performed and a rectangular wave drive region where the rectangular wave drive control is performed. In the mixed region, when the drive controller 30 is performing the PWM drive control at the time of determination by the signal switching determination part 50, if the rotation speed is lower than the first rotation speed threshold value Nthr_one or if the rotation speed is equal to or higher than the first rotation speed threshold value Nthr_one and the voltage command amplitude Apwm is smaller than the first voltage command amplitude threshold value Athr_one, the PWM drive control is continued.

On the other hand, in the mixed region, when the drive controller 30 is performing the rectangular wave drive control at the time of determination by the signal switching determination part 50, if the rotation speed is equal to or higher than the second rotation speed threshold value Nthr_pwm, the rectangular wave drive control is continued.

Thus, in FIG. 3, the mixed region is located between the PWM drive region and the rectangular wave drive region. In the mixed region, the drive control of the motor 2 differs depending on whether the drive controller 30 is performing the PWM drive control or the rectangular wave drive control at the time of determination by the signal switching determination part 50.

Therefore, when switching the drive control between the PWM drive control and the rectangular wave drive control, it is possible to prevent the PWM drive control and the rectangular wave drive control from being frequently switched due to fluctuations in the rotation speed of the motor 2 and the voltage command amplitude. Accordingly, the drive control of the motor 2 can be performed stably.

As described above, in the present embodiment, when the drive control of the motor 2 is switched between the PWM drive control and the rectangular wave drive control, the rotation speed Nmtr of the motor 2 and the voltage command amplitude Apwm at the PWM drive control are taken into consideration, whereby the drive control of the motor 2 can be switched at an appropriate timing. Thus, it is possible to prevent an overcurrent from flowing through the motor 2 or an output torque of the motor 2 from decreasing.

Furthermore, the first rotation speed threshold value Nthr_one used when switching the drive control of the motor 2 from the PWM drive control to the rectangular wave drive control is set to be larger than the second rotation speed threshold value Nthr_pwm used when switching the drive control of the motor 2 from the rectangular wave drive control to the PWM drive control. Therefore, even when the rotation speed Nmtr of the motor 2 fluctuates, it is possible to prevent the drive control of the motor 2 from being frequently switched.

Furthermore, when the drive control of the motor 2 is switched from the rectangular wave drive control to the PWM drive control in the operation pattern in which the motor 2 is decelerated and stopped in a free-run state, it is not necessary to determine the voltage command amplitude as the case of switching the drive control of the motor 2 from the PWM drive control to the rectangular wave drive control. Therefore, when the drive control of the motor 2 is switched from the rectangular wave drive control to the PWM drive control, it is possible to reduce the calculation load of the control device 1.

Second Embodiment

Figure 4:
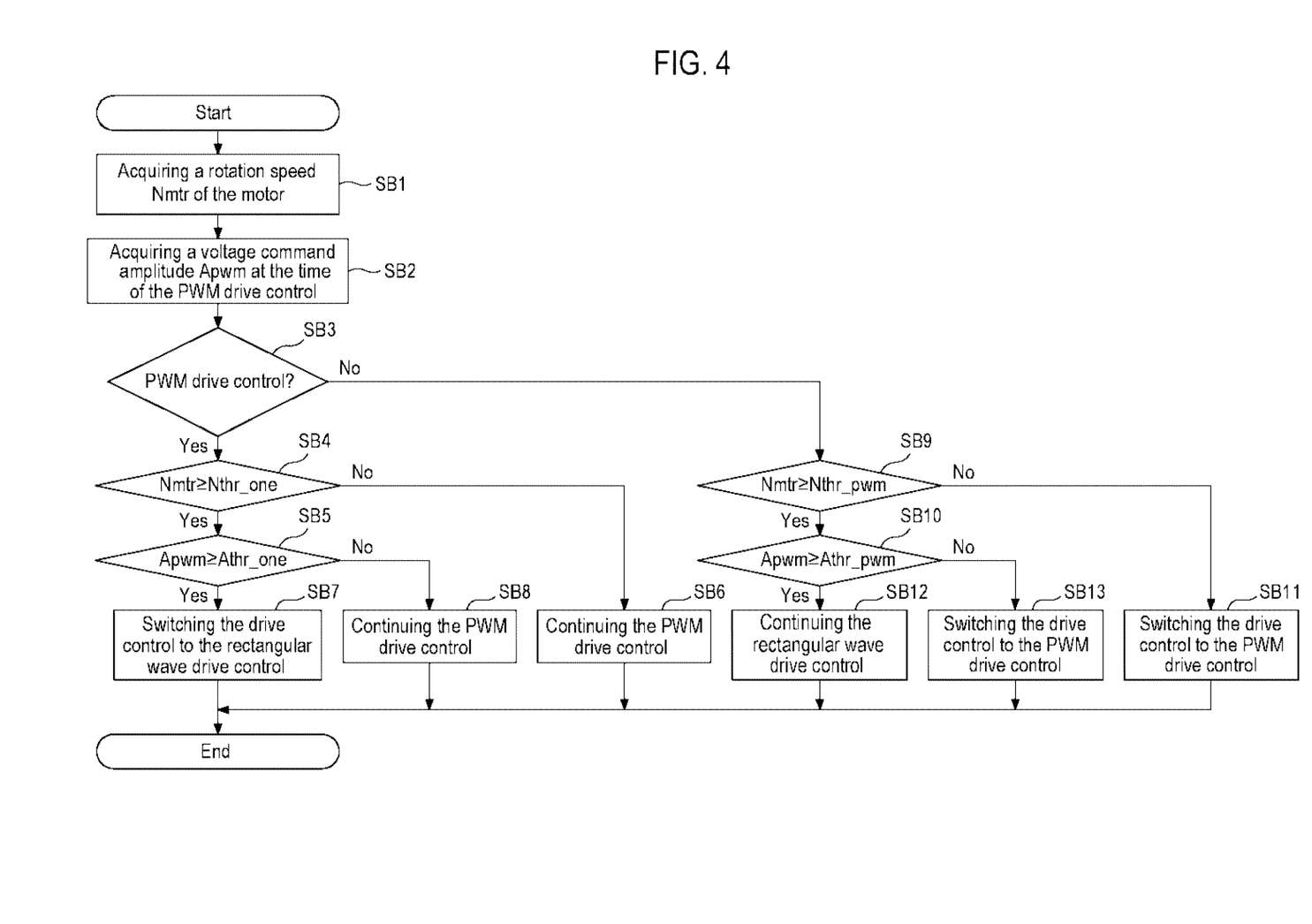
FIG. 4 is a flowchart showing an operation of a signal switching determination part of a control device according to a second embodiment.

FIG. 4 shows a flow of drive control switching determination of the motor 2 by the signal switching determination part 50 in a control device according to a second embodiment. In the present embodiment, the configuration of the control device is the same as the configuration of the control device 1 of the first embodiment, and the flow of drive control switching determination of the motor 2 is different from the flow of the first embodiment. Specifically, in the flow of drive control switching determination of the motor 2 by the signal switching determination part 50, the flow when switching the drive control from the rectangular wave drive control to the PWM drive control is different from the flow of the first embodiment. Hereinafter, the same components as those of the first embodiment are denoted by like reference numerals, and the description thereof is omitted. Only the components different from those of the first embodiment will be described.

If the flow shown in FIG. 4 is started (START), the signal switching determination part 50 acquires a rotation speed Nmtr of the motor 2 and a voltage command amplitude Apwm during the PWM drive control (steps SB1 and SB2), and then determines whether the current drive control of the motor 2 is the PWM drive control or the rectangular wave drive control (step SB3).

When the drive control of the motor 2 is the PWM drive control (when YES in step SB3), if the rotation speed Nmtr of the motor 2 is equal to or higher than the first rotation speed threshold value Nthr_one and the voltage command amplitude Apwm is equal to or larger than the first voltage command amplitude threshold value Athr_one as steps SA4 to SA8 of the first embodiment, the signal switching determination part 50 outputs a determination signal so that the drive control of the motor 2 is switched from the PWM drive control to the rectangular wave drive control. If the rotation speed Nmtr of the motor 2 is lower than the first rotation speed threshold value Nthr_one, or if the voltage command amplitude Apwm is smaller than the first voltage command amplitude threshold value Athr_one, the signal switching determination part 50 outputs a determination signal so as to continue the PWM drive control as the drive control of the motor 2.

Since the operation from step SB1 to step SB8 in the signal switching determination part 50 is the same as the operation from step SA1 to SA8 in the first embodiment, the detailed description of the operation of the respective steps is omitted.

If the drive control of the motor is the rectangular wave drive control (if NO in step SB3), the flow proceeds to step SB9. As step SA9 of the first embodiment, it is determined whether the rotation speed Nmtr of the motor 2 is equal to or higher than the second rotation speed threshold value Nthr_pwm (rotation speed threshold value).

If it is determined in step SB9 that the rotation speed Nmtr of the motor 2 is equal to or higher than the second rotation speed threshold value Nthr_pwm (if YES), the flow proceeds to step SB10 and subsequent steps. It is determined whether the voltage command amplitude Apwm is equal to or larger than the second voltage command amplitude threshold value Athr_pwm. The second voltage command amplitude threshold value Athr_pwm is a voltage command amplitude value at which the drive control can be switched from the rectangular wave drive control to the PWM drive control in the drive controller 30.

On the other hand, if it is determined in step SB9 that the rotation speed Nmtr of the motor 2 is lower than the second rotation speed threshold value Nthr_pwm (if NO), the flow proceeds to step SB11, and the signal switching determination part 50 outputs a determination signal so as to cause the drive controller 30 to switch the drive control to the PWM drive control.

If it is determined in step SB10 that the voltage command amplitude Apwm is equal to or larger than the second voltage command amplitude threshold value Athr_pwm (if YES), the flow proceeds to step SB12, and the signal switching determination part 50 outputs a determination signal so as to cause the drive controller 30 to continue the rectangular wave drive control.

On the other hand, if is determined in step SB10 that the voltage command amplitude Apwm is smaller than the second voltage command amplitude threshold value Athr_pwm (if NO), the flow proceeds to step SB13, and the signal switching determination part 50 outputs a determination signal so as to cause the drive controller 30 to switch the drive control to the PWM drive control.

In steps SB11 to SB13, after the signal switching determination part 50 outputs the determination signal to the drive controller 30, the flow is ended (END).

In this regard, step SB1 corresponds to the rotation speed acquisition step, and step SB2 corresponds to the voltage command amplitude acquisition step. Steps SB3 to SB5, SB9, and SB10 correspond to the signal switching determination step, and steps SB6 to SB8 and SB11 to SB13 correspond to the drive control step.

In the present embodiment, the first rotation speed threshold value Nthr_one is a rotation speed larger than the second rotation speed threshold value Nthr_pwm. The first voltage command amplitude threshold value Athr_one is a voltage command amplitude value larger than the second voltage command amplitude threshold value Athr_pwm.

Figure 5:
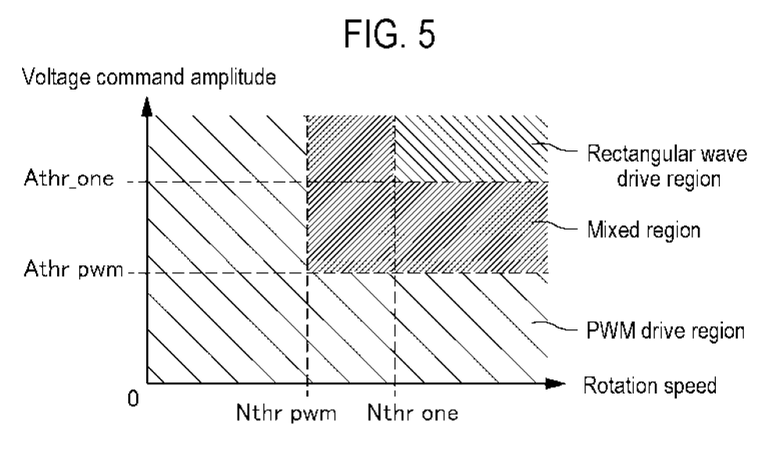
FIG. 5 is a view showing motor drive control regions defined by a first rotation speed threshold value, a second rotation speed threshold value, a first voltage command amplitude threshold value, and a second voltage command amplitude threshold value in the second embodiment.

FIG. 5 shows the drive control regions of the motor 2 defined by the first rotation speed threshold value Nthr_one, the second rotation speed threshold value Nthr_pwm, the first voltage command amplitude threshold value Athr_one, and the second voltage command amplitude threshold value Athr_pwm in the relationship between the rotation speed of the motor 2 and the voltage command amplitude.

As shown in FIG. 5, in the relationship between the rotation speed and the voltage command amplitude, there is a mixed region between a PWM drive region where the PWM drive control is performed and a rectangular wave drive region where the rectangular wave drive control is performed. In the mixed region, when the drive controller 30 is performing the PWM drive control at the time of determination by the signal switching determination part 50, if the rotation speed is lower than the first rotation speed threshold value Nthr_one or if the rotation speed is equal to or higher than the first rotation speed threshold value Nthr_one and the voltage command amplitude Apwm is smaller than the first voltage command amplitude threshold value Athr_one, the PWM drive control is continued.

On the other hand, in the mixed region, when the drive controller 30 is performing the rectangular wave drive control at the time of determination by the signal switching determination part 50, if the rotation speed is equal to or higher than the second rotation speed threshold value Nthr_pwm and the voltage command amplitude is equal to or larger than the second voltage command amplitude threshold value Athr_pwm, the rectangular wave drive control is continued.

Thus, in FIG. 5, the mixed region is located between the PWM drive region and the rectangular wave drive region. In the mixed region, the drive control differs depending on whether the drive controller 30 is performing the PWM drive control or the rectangular wave drive control at the time of determination by the signal switching determination part 50.

Therefore, when switching the drive control between the PWM drive control and the rectangular wave drive control, it is possible to prevent the PWM drive control and the rectangular wave drive control from being frequently switched due to fluctuations in the rotation speed of the motor 2 and the voltage command amplitude. Accordingly, the drive control of the motor 2 can be performed stably.

As described above, in the present embodiment, when the drive control of the motor 2 is the rectangular wave drive control, if the voltage command amplitude Apwm is smaller than the second voltage command amplitude threshold value Athr_pwm, the drive control of the motor 2 is switched to the PWM drive control. Thus, even when the drive control of the motor 2 is the rectangular wave drive control, the drive control of the motor 2 can be switched in consideration of the voltage command amplitude Apwm. Accordingly, the drive control of the motor 2 can be performed at a more appropriate timing. The configuration of the present embodiment is particularly effective when the drive control of the motor 2 is performed even at the time of decelerating the motor 2.

Furthermore, the first voltage command amplitude threshold value Athr_one used when switching the drive control of the motor 2 from the PWM drive control to the rectangular wave drive control is set to be larger than the second voltage command amplitude threshold value Athr_pwm used when switching the drive control of the motor 2 from the rectangular wave drive control to the PWM drive control. Therefore, even when the value of the voltage command amplitude Apwm fluctuates, it is possible to prevent the drive control of the motor 2 from being frequently switched.

Other Embodiments

Although the embodiments of the present disclosure have been described above, the above-described embodiments are nothing more than the illustration for implementing the present disclosure. Therefore, the present disclosure is not limited to the above-described embodiments. The above-described embodiments may be appropriately modified and implemented without departing from the spirit of the present disclosure.

In each of the embodiments described above, in the relationship between the rotation speed of the motor 2 and the voltage command amplitude, the rotation speed threshold value and the voltage command amplitude threshold value are constant at the boundary between the PWM drive region and the mixed region and the boundary between the rectangular wave drive region and the mixed region, respectively. However, each of the rotation speed threshold value and the voltage command amplitude threshold value may be a changing value.

Figure 6:
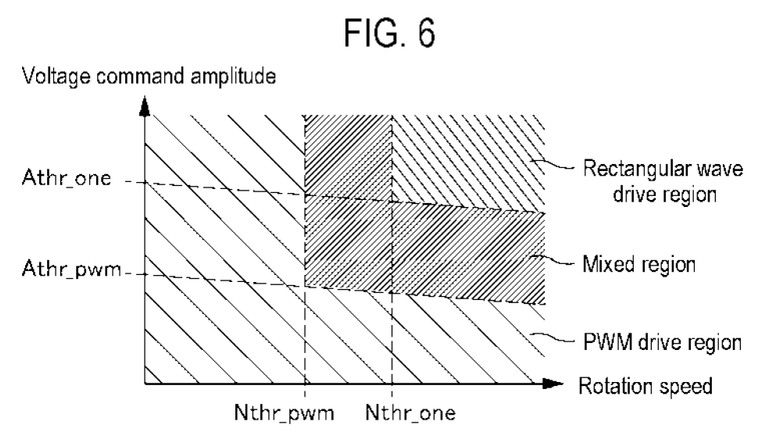
FIG. 6 is a view showing motor drive control regions defined by a first rotation speed threshold value, a second rotation speed threshold value, a first voltage command amplitude threshold value, and a second voltage command amplitude threshold value in a further embodiment.

FIG. 6 shows the drive control regions of the motor 2 when the first voltage command amplitude threshold value Athr_one and the second voltage command amplitude threshold value Athr_pwm are changed according to the rotation speed of the motor 2 in the case of the second embodiment. In FIG. 6, the first voltage command amplitude threshold value Athr_one and the second voltage command amplitude threshold value Athr_pwm become smaller as the rotation speed of the motor 2 grows higher.

That is, in the case of FIG. 6, the first voltage command amplitude threshold value Athr_one and the second voltage command amplitude threshold value Athr_pwm are set such that the values thereof decrease as the rotation speed of the motor 2 increases. Only one of the first voltage command amplitude threshold value Athr_one and the second voltage command amplitude threshold value Athr_pwm may be set such that the value thereof decreases as the rotation speed of the motor 2 increases.

Figure 7:
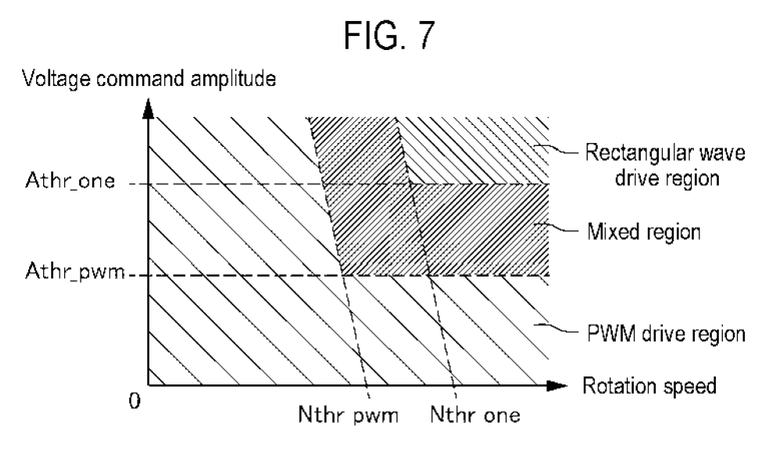
FIG. 7 is a view showing motor drive control regions defined by a first rotation speed threshold value, a second rotation speed threshold value, a first voltage command amplitude threshold value, and a second voltage command amplitude threshold value in a still further embodiment.

FIG. 7 shows the drive control regions of the motor 2 when the first rotation speed threshold value Nthr_one and the second rotation speed threshold value Nthr_pwm of the motor 2 are changed according to the voltage command amplitude in the case of the second embodiment. In FIG. 7, the first rotation speed threshold value Nthr_one and the second rotation speed threshold value Nthr_pwm become smaller as the voltage command amplitude grows larger.

That is, in the case of FIG. 7, the first rotation speed threshold value Nthr_one and the second rotation speed threshold value Nthr_pwm are set such that the values thereof become smaller as the voltage command amplitude grows larger. Only one of the first rotation speed threshold value Nthr_one and the second rotation speed threshold value Nthr_pwm may be set such that the value thereof decreases as the voltage command amplitude increases.

The rotation speed threshold value and the voltage command amplitude threshold value may be changed. That is, the first voltage command amplitude threshold value Athr_one and the second voltage command amplitude threshold value Athr_pwm may decrease as the rotation speed of the motor 2 increases, and the first rotation speed threshold value Nthr_one and the second rotation speed threshold value Nthr_pwm may decrease as the voltage command amplitude increases.

Although FIGS. 6 and 7 show other examples of the motor drive control regions in the second embodiment, the same applies to the motor drive control regions in the first embodiment.

In the first embodiment, the first rotation speed threshold value Nthr_one is a rotation speed larger than the second rotation speed threshold value Nthr_pwm. However, the first rotation speed threshold value Nthr_one may be the same rotation speed as the second rotation speed threshold value Nthr_pwm.

In the second embodiment, the first rotation speed threshold value Nthr_one is a rotation speed larger than the second rotation speed threshold value Nthr_pwm, and the first voltage command amplitude threshold value Athr_one is a voltage command amplitude value larger than the second voltage command amplitude threshold value Athr_pwm. However, the first rotation speed threshold value Nthr_one may be the same rotation speed as the second rotation speed threshold value Nthr_pwm. The first voltage command amplitude threshold value Athr_one may be the same voltage command amplitude value as the second voltage command amplitude threshold value Athr_pwm.

In each of the embodiments described above, the configuration of the control device 1 that controls the drive of the motor 2 which is a three-phase AC motor has been described. However, the present disclosure is not limited thereto and may also be applied to a control device for controlling the drive of AC motors with multiple phases other than three phases. That is, the motor may have any configuration as long as it is a synchronous electric motor.

INDUSTRIAL USE OF THE PRESENT DISCLOSURE

The present disclosure can be used for a control device capable of switching a drive control of a synchronous electric motor between a PWM drive control and a rectangular wave drive control.

What is claimed is:
1. A control device for a synchronous electric motor that controls a drive of the synchronous electric motor, comprising:
   a voltage command generator configured to generate a voltage command based on an input command;
   a PWM signal generator configured to generate a PWM signal based on the voltage command;
   a rectangular wave signal generator configured to generate a rectangular wave signal based on the input command;
   a rotation speed detector configured to detect a rotation speed of the synchronous electric motor;
   a signal switching determination part configured to determine, according to at least the rotation speed, whether the PWM signal generated by the PWM signal generator or the rectangular wave signal generated by the rectangular wave signal generator is used as a control signal when controlling the drive of the synchronous electric motor; and
   a drive controller configured to control the drive of the synchronous electric motor using either the PWM signal or the rectangular wave signal that is determined by the signal switching determination part to be used as the control signal,
   wherein the signal switching determination part is further configured to:
      determine that the PWM signal is used as the control signal if the rotation speed is lower than a rotation speed threshold value or if a voltage command amplitude is smaller than a voltage command amplitude threshold value; and
      determine that either the PWM signal or the rectangular wave signal is used as the control signal according to at least one of a drive control state of the synchronous electric motor by the drive controller and the voltage command amplitude, if the rotation speed is equal to or higher than the rotation speed threshold value,
   wherein the signal switching determination part is further configured to, in the determining that either the PWM signal or the rectangular wave signal is used as the control signal according to at least one of the drive control state of the synchronous electric motor by the drive controller and the voltage command amplitude:
      set a first rotation speed threshold value, which is a threshold value of a rotation speed used at a time of switching the PWM signal to the rectangular wave signal, as the rotation speed threshold value if the drive control state of the synchronous electric motor by the drive controller is a PWM drive control state drive-controlled by the PWM signal, and determine that the rectangular wave signal is used as the control signal if the rotation speed is equal to or higher than the first rotation speed threshold value and if the voltage command amplitude is equal to or larger than a first voltage command amplitude threshold value; and set a second rotation speed threshold value, which is a threshold value of a rotation speed used at a time of switching the rectangular wave signal to the PWM signal, as the rotation speed threshold value if the drive control state of the synchronous electric motor by the drive controller is a rectangular wave drive control state drive-controlled by the rectangular wave signal, and determine that the PWM signal is used as the control signal if the rotation speed is lower than the second rotation speed threshold value, wherein the first rotation speed threshold value is set to be larger than the second rotation speed threshold value, and wherein the signal switching determination part is further configured to, in the determining that either the PWM signal or the rectangular wave signal is used as the control signal according to at least one of the drive control state of the synchronous electric motor by the drive controller and the voltage command amplitude:

if the rotation speed is equal to or higher than the second rotation speed threshold value and if the rectangular wave signal has been used as the control signal, continue using the rectangular wave signal as the control signal.

2. The control device of claim 1, wherein the signal switching determination part is further configured to, in the determining that either the PWM signal or the rectangular wave signal is used as the control signal according to at least one of the drive control state of the synchronous electric motor by the drive controller and the voltage command amplitude:

set a second voltage command amplitude threshold value, which is a threshold value of a voltage command amplitude used at the time of switching the rectangular wave signal to the PWM signal, as the voltage command amplitude threshold value if the drive control state of the synchronous electric motor by the drive controller is the rectangular wave drive control state drive-controlled by the rectangular wave signal, and determine that the PWM signal is used as the control signal if the voltage command amplitude is smaller than the second voltage command amplitude threshold value.

3. The control device of claim 2, wherein the first voltage command amplitude threshold value is larger than the second voltage command amplitude threshold value.

4. The control device of claim 1, wherein the second rotation speed threshold value is set to a value at which overcurrent flowing through the synchronous electric motor and the drive controller is prevented as the rectangular wave signal is switched to the PWM signal.

5. A control method for a synchronous electric motor that controls a drive of the synchronous electric motor using a PWM signal or a rectangular wave signal generated based on an input signal, comprising:

a rotation speed acquisition step of acquiring a rotation speed of the synchronous electric motor;

a voltage command amplitude acquisition step of acquiring an amplitude of a voltage command based on an input command;

a signal switching determination step of determining, according to at least the rotation speed, whether the PWM signal or the rectangular wave signal is used as a control signal when controlling the drive of the synchronous electric motor; and a drive control step of controlling the drive of the synchronous electric motor using either the PWM signal or the rectangular wave signal that is determined in the signal switching determination step to be used as the control signal, wherein the signal switching determination step includes:

determining that the PWM signal is used as the control signal if the rotation speed is lower than a rotation speed threshold value or if a voltage command amplitude is smaller than a voltage command amplitude threshold value; and determining that either the PWM signal or the rectangular wave signal is used as the control signal according to at least one of a drive control state of the synchronous electric motor by a drive controller and the voltage command amplitude, if the rotation speed is equal to or higher than the rotation speed threshold value, wherein the determining that either the PWM signal or the rectangular wave signal is used as the control signal according to at least one of the drive control state of the synchronous electric motor by the drive controller and the voltage command amplitude includes:

setting a first rotation speed threshold value, which is a threshold value of a rotation speed used at a time of switching the PWM signal to the rectangular wave signal, as the rotation speed threshold value if the drive control state of the synchronous electric motor by the drive controller is a PWM drive control state drive-controlled by the PWM signal, and determining that the rectangular wave signal is used as the control signal if the rotation speed is equal to or higher than the first rotation speed threshold value and if the voltage command amplitude is equal to or larger than a first voltage command amplitude threshold value; and setting a second rotation speed threshold value, which is a threshold value of a rotation speed used at a time of switching the rectangular wave signal to the PWM signal, as the rotation speed threshold value if the drive control state of the synchronous electric motor by the drive controller is a rectangular wave drive control state drive-controlled by the rectangular wave signal, and determining that the PWM signal is used as the control signal if the rotation speed is lower than the second rotation speed threshold value, wherein the first rotation speed threshold value is set to be larger than the second rotation speed threshold value, and wherein the determining that either the PWM signal or the rectangular wave signal is used as the control signal according to at least one of the drive control state of the synchronous electric motor by the drive controller and the voltage command amplitude further includes:

if the rotation speed is equal to or higher than the second rotation speed threshold value and if the rectangular wave signal has been used as the control signal, continuing to use the rectangular wave signal as the control signal.

6. The control method of claim 5, wherein the second rotation speed threshold value is set to a value at which overcurrent flowing through the synchronous electric motor and the drive controller is prevented as the rectangular wave signal is switched to the PWM signal.

* * * * *